(12) United States Patent
Navratil et al.

(10) Patent No.: US 7,424,425 B2
(45) Date of Patent: Sep. 9, 2008

(54) OPTIMIZATION OF DETECTION SYSTEMS USING A DETECTION ERROR TRADEOFF ANALYSIS CRITERION

(75) Inventors: Jiri Navratil, White Plains, NY (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 10/151,352

(22) Filed: May 19, 2002

(65) Prior Publication Data

US 2003/0216916 A1    Nov. 20, 2003

(51) Int. Cl.
*G10L 15/00* (2006.01)
(52) U.S. Cl. .................. 704/247; 704/248; 704/250
(58) Field of Classification Search .......... 704/231, 704/233, 236, 239, 240, 243, 246–248, 250; 379/88
See application file for complete search history.

(56) References Cited

U.S. PATENT DOCUMENTS

| | | | | |
|---|---|---|---|---|
| 5,121,428 A | * | 6/1992 | Uchiyama et al. ........... 704/243 |
| 5,689,616 A | * | 11/1997 | Li ............................... 704/232 |
| 5,717,826 A | * | 2/1998 | Setlur et al. ................. 704/252 |
| 5,839,103 A | * | 11/1998 | Mammone et al. .......... 704/232 |
| 5,842,161 A | * | 11/1998 | Cohrs et al. ................. 704/251 |
| 6,029,124 A | * | 2/2000 | Gillick et al. ............... 704/200 |
| 6,411,930 B1 | * | 6/2002 | Burges ........................ 704/240 |
| 6,539,352 B1 | * | 3/2003 | Sharma et al. .............. 704/249 |

* cited by examiner

*Primary Examiner*—Richemond Dorvil
*Assistant Examiner*—Leonard Saint Cyr
(74) *Attorney, Agent, or Firm*—Ference & Associates LLC

(57) ABSTRACT

In detection systems, such as speaker verification systems, for a given operating point range, with an associated detection "cost", the detection cost is preferably reduced by essentially trading off the system error in the area of interest with areas essentially "outside" that interest. Among the advantages achieved thereby are higher optimization gain and better generalization. From a measurable Detection Error Tradeoff (DET) curve of the given detection system, a criterion is preferably derived, such that its minimization provably leads to detection cost reduction in the area of interest. The criterion allows for selective access to the slope and offset of the DET curve (a line in case of normally distributed detection scores, a curve approximated by mixture of Gaussians in case of other distributions). By modifying the slope of the DET curve, the behavior of the detection system is changed favorably with respect to the given area of interest.

13 Claims, 2 Drawing Sheets

OPTIMIZATION OF A LINEAR COMBINATION OF MULTIPLE DETECTION SYSTEMS

OPTIMIZATION OF DETECTION SYSTEMS USING A DETECTION ERROR TRADEOFF ANALYSIS CRITERION

FIELD OF THE INVENTION

The present invention relates generally to detection systems in the realm of speaker verification (or speaker identification, authentication or recognition) and in other applications, such as radar detection, fire alarms, visual (face) detection and many others.

BACKGROUND OF THE INVENTION

Generally, the functionality of detection systems is defined by the capability to analyze a certain input sample (for example, a speech recording, a video or radar signal, etc.), compare it to a particular "claimed" or hypothesized pre-stored sample (e.g., a template or model) and to decide whether the observed test sample and the pre-stored sample match or not (i.e., to accept or reject the claim). The detection task can also be extended in a broader sense to cases involving a mixture of input samples, with the objective of detecting a particular claimed target within this mixture.

The quality of detection systems is measured primarily by evaluating two types of error (i.e., the expected values of such errors): "False Alarm Rate", and "Miss Rate". Low values of both measurements reflect more accurate systems. Typically, detection systems are trained/optimized according to criteria that minimize the two error rates simultaneously and along all operating points of the detection system. To such criteria belong maximum entropy, linear discriminative analysis, and indirectly, maximum likelihood.

To date, efforts towards such minimization have not yielded sufficiently desirable results. A need has therefore been recognized in connection with providing an arrangement that surpasses the performance hitherto encountered.

SUMMARY OF THE INVENTION

In accordance with at least one presently preferred embodiment of the present invention, for a given operating point range, with an associated detection "cost", the detection cost is preferably reduced by essentially trading off the system error in the area of interest with areas essentially "outside" that interest. Among the advantages achieved thereby are higher optimization gain and better generalization.

From a measurable Detection Error Tradeoff (DET) curve of the given detection system, a criterion is preferably derived, such that its minimization provably leads to detection cost reduction in the area of interest. The criterion allows for selective access to the slope and offset of the DET curve (a line in case of normally distributed detection scores, a curve approximated by mixture of Gaussians in case of other distributions). By modifying the slope of the DET curve, the behavior of the detection system is changed favorably with respect to the given area of interest.

Experimental observations show that the slope component of this new criterion exhibits significantly better generalization behavior compared to the conventional methods as described herein. The criterion is applicable to any detection system which works on the basis of detection scores that are mixture-Gaussian distributed. An implementation description is exercised herebelow in connection with an existing text-independent speaker verification system as described in Navratil, J., Chaudhari, U. V., Ramaswamy, G. N., "Speaker verification using target and background dependent linear transforms and multi-system fusion," (Proceedings of EUROSPEECH-01, Aalborg, Denmark, September 2001), where the optimization is applied on the feature space level of each single system, as well as for combining multiple systems.

In summary, the present invention relates, in one aspect, to an apparatus for facilitating detection in a detection system, the apparatus comprising: an input arrangement which accepts input data comprising true target data and non-target data; a detection arrangement which evaluates the input data and derives scores from the input data; and an evaluation arrangement which evaluates the scores and which successively prompts revision of at least one aspect associated with the scores until the scores reach a predetermined quality; wherein the evaluation arrangement is adapted to minimize a criterion associated with a detection error tradeoff relating to the scores.

In an additional aspect, the present invention relates to a method of facilitating detection in a detection system, the method comprising steps of: accepting input data comprising true target data and non-target data; evaluating the input data and deriving scores from the input data; and evaluating the scores and then successively prompting revision of at least one aspect associated with the scores until the scores reach a predetermined quality; wherein the step of evaluating the scores comprises minimizing a criterion associated with a detection error tradeoff relating to the scores.

In a further aspect, the present invention relates to a program storage device readable by machine, tangibly embodying a program of instructions executable by the machine to perform method steps for facilitating detection in a detection system, the method comprising steps of: accepting input data comprising true target data and non-target data; evaluating the input data and deriving scores from the input data; and evaluating the scores and then successively prompting revision of at least one aspect associated with the scores until the scores reach a predetermined quality; wherein the step of evaluating the scores comprises minimizing a criterion associated with a detection error tradeoff relating to the scores.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
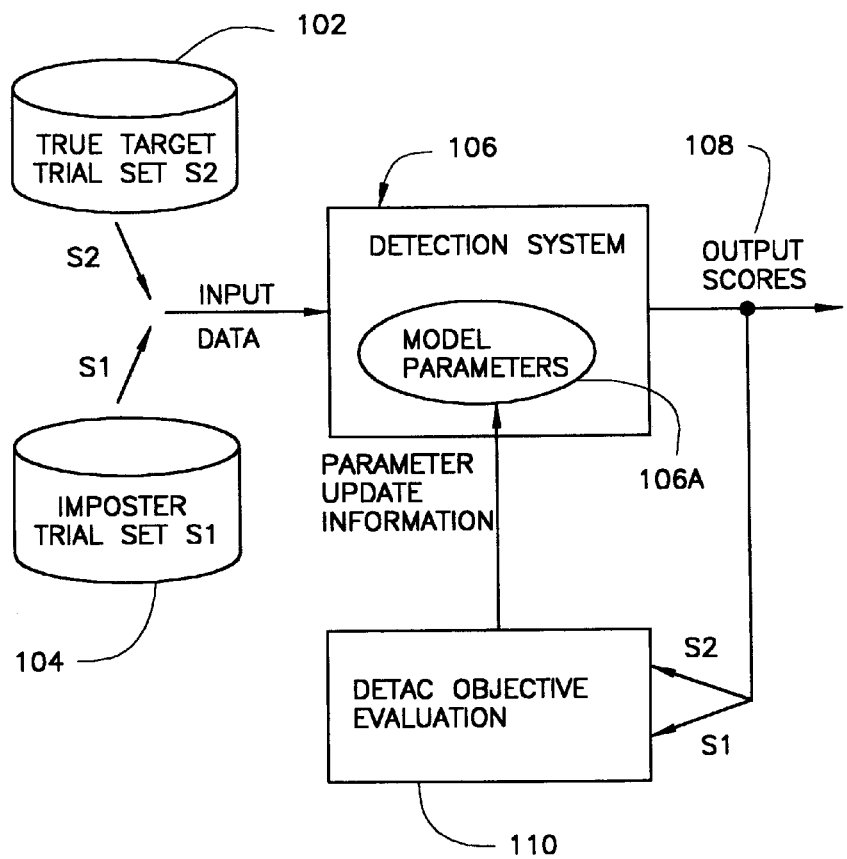
FIG. 1 schematically illustrates parameter optimization in a detection system.

By way of background, the DET curve for assessment of detection systems was introduced in Martin, A. et al., "The DET Curve in Assessment of Detection Task Performance," (Proceedings of EUROSPEECH-97, Rhodos, Greece, pp. 1895-1898) as an alternative to the Receiver Operating Characteristics (ROC) usually plotted on linear axes, offering a better viewability due to special, nonlinear scaling. The axes of the DET plot are scaled according to the normal error function defined as $$\Phi(t) = \int_{-\infty}^{t} \frac{1}{\sqrt{2\pi}} e^{-\frac{\tau^2}{2}} d\tau$$

with t denoting the threshold applied on the detection score.

Given a specific detection system that supplies real-valued scores for a trial (i.e., a test sample and a claimed model), the Detection Error Tradeoff Analysis Criterion (DETAC) is formulated for two cases of score distribution types: 1) the Gaussian, and 2) the Gaussian-Mixture distribution.

As regards, Gaussian Distributed Detection Scores, it should be noted that the DET curve generally appears as a straight line for these distributions. Assuming that the impostor (false claims) trial scores are normally distributed with mean $\mu_1$ and standard deviation $\sigma_1$, and the true target scores with $\mu_2$ and $\sigma_2$, the DETAC criterion is formulated in variants of constrained and unconstrained optimization, with an optimization parameter set θ, as follows:

Constrained Minimization of DETAC Slope:

$$\theta^* = \arg\min_{\theta} \pm R(\theta), \text{ subject to } D(\theta) \leq 0 \quad (1)$$

Constrained Minimization of DETAC Bias:

$$\theta^* = \arg\min_{\theta} D(\theta), \text{ subject to } R(\theta) = 0 \quad (2)$$

Unconstrained Minimization of DETAC:

$$\theta^* = \arg\min_{\theta} w_R(R(\theta) - C_R) + w_D(D(\theta) - C_D) \quad (3)$$

where $$R(\theta) = w_R \left( \frac{\sigma_1(\theta)}{\sigma_2(\theta)} - C_R \right),$$

is the Sigma-Ratio corresponding to the DET line slope $$D(\theta) = w_D \left( \frac{\mu_1(\theta) - \mu_2(\theta)}{\sigma_2(\theta)} - C_D \right)$$

is the Delta-Term corresponding to the DET line as and $w_R, w_D \in R$ being arbitrary regulator constants and $C_R, C_D \in R$ the initial values of the Sigma-Ratio and the Delta-Term respectively.

The minimization (1) aims at reducing or increasing the slope of the DET line depending on the location of the operating point ("+" if the OP requires false alarm rate to be lower than that of the Equal-Error-Rate, "−" otherwise), while keeping the bias constant or smaller than the initial value. The minimization (2) aims at reducing the DET bias while keeping the slope constant. For (1) and (2) the reduction of the objective guarantees a reduction on both error types (False Alarm, Miss) for the given operating area on training data set.

The minimization (3) aims at reducing both weighted terms simultaneously. It represents a compromise between (1) and (2), which can be easily implemented with most optimization software packages. The distribution parameters $\sigma_{1,2} \mu_{1,2}$ are a function of the optimization set θ. This functional relationship depends on the particular system structure and implementation and has to be determined for each case individually. Later on, two examples for the most common speaker detection systems on the basis of Gaussian Mixture Models (GMM) are described.

In the case of non-Gaussian detection score distributions, the approximation by a mixture of Gaussian densities is used. The two error probabilities are written as a weighted sum of error components, each distributed with a mean and a standard deviation:

$$P_M(t) = \sum_i \pi_i e_{Mi}(t) = \sum_i \pi_i \int_{-\infty}^{t} N(\tau, \mu_i, \sigma_i) d\tau = \sum_i \pi_i \Phi\left(\frac{t - \mu_i}{\sigma_i}\right)$$

(Probability of Miss)

and $$P_{FA}(t) = \sum_i \pi_i e_{FA}(t) = \sum_i \pi_i \int_{t}^{\infty} N(\tau, \mu_i, \sigma_i) d\tau = \sum_i \pi_i \Phi\left(\frac{\mu_i - t}{\sigma_i}\right)$$

(Probability of False Alarm).

Let $F_0$(Sigma-Ratio, Delta-Term) denote the DETAC objective function for Gaussian distributed scores, i.e. one of the three introduced hereinabove. Then, the DETAC objective function for Gaussian mixture distributions can be defined as $$F_{GM} = \sum_{\substack{i \in T \\ j \in \bar{T}}} \beta_{ij} F_0 \left( \frac{\sigma_{1i}}{\sigma_{2j}}, \frac{\mu_{1i} - \mu_{2j}}{\sigma_{2j}} \right)$$

where T,T̄ are the true target and the impostor trial sets respectively, $\beta_{ij}$ are pairwise component weights that sum up to 1. The weights should be proportional to the Bayes error between the components "i" and "j", and one suitable function type is the Chernoff bound (upper bound on the Bayes error):

$$\beta_{ij} = c_{ij} \sqrt{\pi_i \pi_j} e^{-u(0.5, \sigma_{1i}, \sigma_{2j}, \mu_{1i}, \mu_{2j})}$$

where μ is a distance function, for 0.5 known as the Bhattacharyya distance (see Fukunaga, S., "Statistical pattern recognition," Academic Press, 2nd Ed., 1990) and c are normalizing constants so that the weights sum up to 1.

The minimization is carried out using $F_{GM}$ as objective and with one of the choices (1)-(3) for $F_0$.

The disclosure now turns to an example of a DETAC application in speaker verification.

As far as optimizing the models goes, the system on the basis of GMMs as described in Navratil, supra is preferably used. In this system, each target speaker has a model created in the initial training phase. In the test phase, the logarithmic likelihood-ratio score between the target model and a universal background model (UBM) is calculated. Given a test sequence of d-dimensional feature vectors, it can be shown that the average componentwise log-likelihood-ratio (LLR) can be written in a compact form trAB+c where "tr" denotes the matrix trace operator, A is an arbitrary d×d matrix transforming the feature space in each GMM component, B is a precomputed d×d matrix containing the model and the feature information and c is a constant.

Using the training sets T,T, the transform A can be optimized with respect the DETAC defined above, thus improving the detection accuracy of the baseline system. A is a full-rank transform and can be optimized either globally or on a speaker-dependent basis. (This example can be appreciated with reference to FIG. 1, described in more detail further below.)

As far as the optimization of linear system combinations goes, it should be recognized that combining multiple detection systems is a well known method to improve the overall accuracy. An example of a simple combination is the linear combination of detection scores S output by N systems $$s_{tot} = \sum_{k=1}^{N} w_k s_k$$

where a set of weights w is used. This set can be optimized by using the following forms of the Sigma-Ratio and Delta-Term of the DETAC:

Sigma-Term: $\sqrt{\frac{a^T S_1 a}{a^T S_2 a}}$  Delta-Term: $\frac{a^T(\mu_1 - \mu_2)}{\sqrt{a^T S_2 a}}$ in which $S = cov(s) \in R^{N \times N}; \mu \in R^{N \times 1}$ are the covariances and means of the targets and impostor scores formed into N-dimensional vectors $s_i = [s_{i1} s_{i2} \ldots s_{iN}]^T$, and $\alpha \in R^{N \times 1}$ is a projection vector containing the set of linear weights to be optimized.

After the DETAC optimization, the vector a represents the best set of weights with respect to the bias and slope implicit to DETAC, and the total score can be obtained as $$s_{tot} = \alpha^T s$$

(This example can be appreciated with reference to FIG. 2, described in more detail further below.)

It should now be recognized that there are numerous model and system optimization methods available in the technical literature that allow for improving the accuracy of recognition systems (e.g., speaker verification systems). Typically, detection tasks are viewed as a special case of classification between two classes. Hence, most optimization techniques, applied to detection systems, concentrate on reducing the overall error caused by the class overlap in distributions. Some techniques try to achieve this via a naive approach, namely by optimizing each class independently (e.g., Maximum Likelihood techniques) other techniques aim at minimizing the Bayes error (discriminative techniques). (Background information on both types of techniques may be found in Duda R. et al., "Pattern Classification and Scene Analysis", Wiley, 1973.) It can be shown that the Delta-Term of the DETAC function in (1)-(3) corresponds to some of these discriminative techniques, i.e. its minimization corresponds to minimizing the Bayes error.

However, in accordance with at least one presently preferred embodiment of the present invention, the Sigma-Ratio term of the DETAC has a different objective. Instead of minimizing the overall Bayes error of the classifier (detection system), its minimization leads to changes in the shape of the Bayes error area (class overlap). These changes may result in relative accuracy improvements in certain operating regions of the DET curve, outbalanced by error rate increases in others. Thus, DETAC can also represent a way of reshaping the Bayes error area in a controlled and provable way. From experimental observations, it appears that the process of reshaping the error area is easier to achieve than reducing the area of the error itself, which can be observed as a better generalization behavior of the optimized parameters.

It should be appreciated that while specific references have been made herein to the realm of speaker verification, DETAC can actually be applicable to essentially any detection system (e.g. as described in the "Field of the Invention" and "Background of the Invention" sections), in which some optimization parameters can be identified and their functional relationship to the DETAC parameters $\mu, \sigma$ can be determined or approximated, either analytically or heuristically. Additional conceivable applications include, but are not limited to, a wide range of "two-class" detection systems including biometric detection systems (e.g., not only those that face detection but those that involve fingerprint detection or any of a wide range of other types of bodily detection), automobile alarms, topic detection, language detection and even medical tests, including pregnancy tests.

FIG. 1 schematically illustrates parameter optimization in a detection system using DETAC in accordance with an embodiment of the present invention. Details relating to the different components or steps shown may be appreciated, in non-restrictive and illustrative fashion, from the discussion heretofore. As shown in FIG. 1, data from a true target trial data set S2 (indicated at 102) and from an imposter trial set S1 (indicated at 104) are preferably input into a detection system 106 which includes model parameters 106a. Output scores 108, relating to both sets S1 and S2, then preferably undergo evaluation via DETAC (110). If needed, model parameters 106a will be updated (preferably in accordance with DETAC as described heretofore) and this cycle may preferably repeat itself until the output scores 108 reach or exceed a predetermined quality as discussed heretofore.

Figure 2:
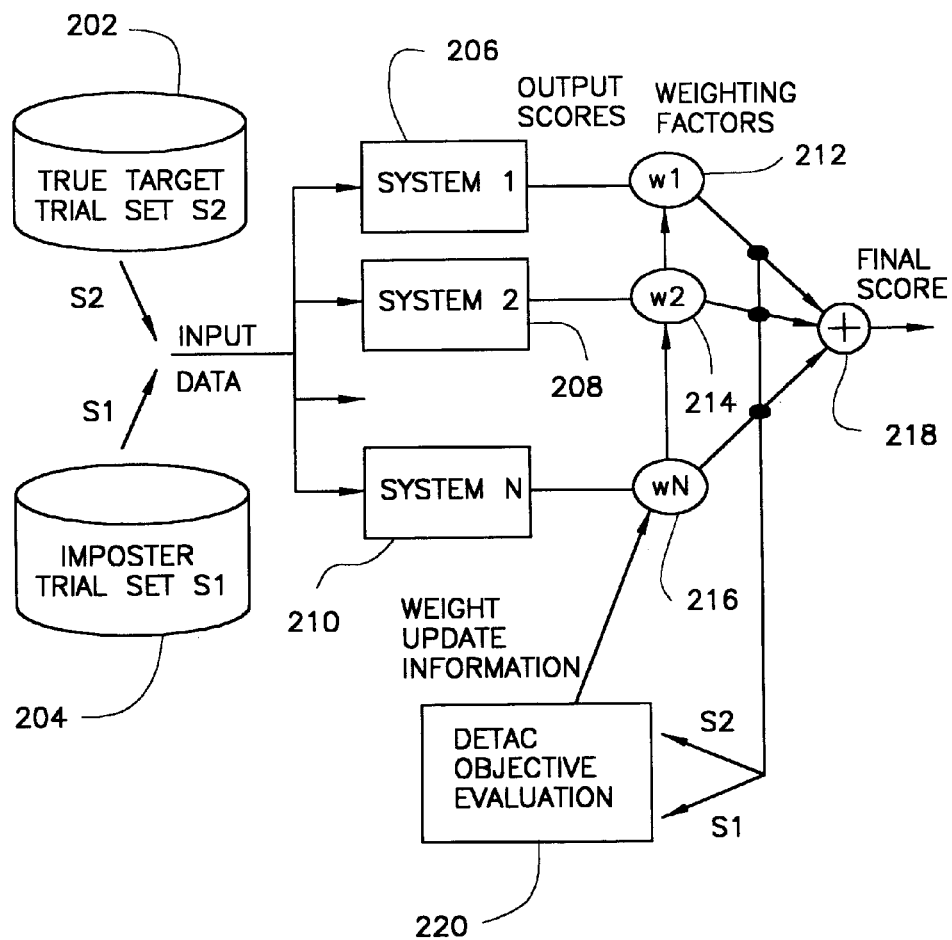
FIG. 2 schematically illustrates the optimization of a linear combination of multiple detection systems.

FIG. 2 schematically illustrates the optimization of a linear combination of multiple detection systems in accordance with an embodiment of the present invention. Again, details relating to the different components or steps shown may be appreciated, in non-restrictive and illustrative fashion, from the discussion heretofore. As shown in FIG. 2, data from a true target trial data set S2 (indicated at 202) and from an imposter trial set S1 (indicated at 204) are preferably input into several detection systems 1, 2, . . . N (indicated at 206, 208 and 210). In this case, a corresponding weighting factor (w1, w2, . . . wN; indicated at 212, 214 and 216) associated with each system will be applied to output scores from each system. The weighted scores, relating to both sets S1 and S2, then preferably undergo evaluation via DETAC (110). If needed, the weights w1, w2, . . . wN (at 212, 214, 216) will be updated (preferably in accordance with DETAC as described heretofore) and this cycle may preferably repeat itself until a combined final score (at 218) reaches or exceeds a predetermined quality as discussed heretofore.

It should be understood that the "impostor data" indicated at 104 and 204 in FIGS. 1 and 2, respectively, may also be generally construed as "non-target data" in a wide variety of applications not only in speaker verification but in many others, such as those referred to heretofore.

It is to be understood that the present invention, in accordance with at least one presently preferred embodiment, includes an input arrangement which accepts input data comprising true target data and non-target data, a detection arrangement which evaluates the input data and derives scores from the input data, and an evaluation arrangement which evaluates the scores and which successively prompts revision of at least one aspect associated with the scores until the scores reach a predetermined quality. Together, the input arrangement, detection arrangement and evaluation arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer implemented method of facilitating verification in a detection system, said method comprising steps of:
   accepting input data comprising true target data and non-target data;
   evaluating the input speech data and deriving scores from the input speech data; and
   evaluating a criterion associated with a detection error tradeoff curve relating to said scores using an evaluation loop in which said criterion is minimized through successively adapting the scores until said scores reach a predetermined quality wherein the reduction of both a False Alarm Rate error and a Miss Rate error are simultaneously achieved.

2. The method according to claim 1, wherein the detection system is a speaker detection system used in speaker verification.

3. The method according to claim 1, wherein said step of evaluating the scores comprises accepting a Gaussian score distribution associated with the scores.

4. The method according to claim 1, wherein said step of evaluating the scores comprises accepting a Gaussian-Mixture distribution associated with the scores.

5. The method according to claim 1, wherein said step of deriving scores comprises using model parameters in deriving scores from the input data.

6. The method according to claim 5, wherein said step of successively prompting revision of at least one aspect associated with the scores comprises successively prompting revision of the model parameters until the scores reach a predetermined quality.

7. The method according to claim 1, further comprising:
   providing a plurality of detection systems for evaluating the input data and deriving scores from the input data;
   said step of deriving scores comprising using a predetermined weighting factor associated with each detection system in deriving scores from the input data.

8. The method according to claim 7, wherein said step of successively prompting revision of at least one aspect associated with the scores comprises successively prompting revision of the weighting factors until a final score comprising a sum of weighted scores reaches a predetermined quality.

9. The method according to claim 1, wherein the criterion associated with a detection error tradeoff is selectively applied to modify at least one of: the slope of a detection error tradeoff curve and the offset of a detection error tradeoff curve.

10. The method according to claim 9, wherein the criterion associated with a detection error tradeoff is selectively applied to modify the slope and offset of a detection error tradeoff curve.

11. The method according to claim 10, wherein the criterion associated with a detection error tradeoff is selectively applied to modify the slope and offset of a detection error tradeoff curve in a direction of interest and in a controlled fashion.

12. The method according to claim 9, wherein the detection error tradeoff curve relates at least to a false alarm rate.

13. The method according to claim 9, wherein the detection error tradeoff curve relates at least to a miss rate.

* * * * *